United States Patent
Zhang et al.

(10) Patent No.: US 10,900,261 B2
(45) Date of Patent: Jan. 26, 2021

(54) SYSTEMS AND METHODS FOR OPENING A VEHICLE DOOR

(71) Applicant: Ford Global Technologies LLC, Dearborn, MI (US)

(72) Inventors: Kadin Zhang, Nanjing (CN); Adrian Tong, Nanjing (CN); Raymond Zhang, Nanjing (CN); Alec Dai, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 149 days.

(21) Appl. No.: 16/058,091

(22) Filed: Aug. 8, 2018

(65) Prior Publication Data
US 2019/0078359 A1 Mar. 14, 2019

(30) Foreign Application Priority Data
Sep. 14, 2017 (CN) .......................... 2017 1 0829182

(51) Int. Cl.
| | |
|---|---|
| *E05B 85/12* | (2014.01) |
| *E05B 77/08* | (2014.01) |
| *B60Q 9/00* | (2006.01) |
| *E05B 85/16* | (2014.01) |
| *E05B 81/76* | (2014.01) |

(52) U.S. Cl.
CPC .............. *E05B 81/77* (2013.01); *B60Q 9/008* (2013.01); *E05B 77/08* (2013.01); *E05B 85/12* (2013.01); *E05B 85/16* (2013.01)

(58) Field of Classification Search
CPC .......... E05B 81/77; E05B 77/08; E05B 85/16; E05B 85/12; B60Q 9/008
See application file for complete search history.

(56) References Cited

U.S. PATENT DOCUMENTS

2017/0057357 A1 3/2017 Borghi
2017/0158170 A1* 6/2017 Gerdes .................... E05B 85/12

FOREIGN PATENT DOCUMENTS

CN 201796474 U 4/2011
CN 203172524 U 9/2013
(Continued)

OTHER PUBLICATIONS

Intelligent Car Door Clams Up When Danger's About https://www.newscientist.com/article/dn16895-intelligent-car-doorclams-up-when-dangers-about/.

*Primary Examiner* — D Glenn Dayoan
*Assistant Examiner* — Melissa Ann Bonifazi
(74) *Attorney, Agent, or Firm* — Brandon Hicks; Kolitch Romano LLP

(57) ABSTRACT

The present disclosure discloses a system for opening a door of a vehicle from an interior of the vehicle. The system includes a handle disposed on an inner surface of the door, a proximity sensor, a latch assembly connected with the handle, and a controller in communication with the proximity sensor and the latch assembly. The handle has a connection portion pivotally connected with the door and a grabbing portion opposite to the connection portion. The proximity sensor is configured to detect an object in proximity. The latch assembly is configured to be locked to keep the door closed or unlocked to allow the door opened. The controller is configured to, at a first mode, activate the latch assembly when the proximity sensor detects the object in proximity such that an opening action on the handle is capable of unlocking the latch assembly.

18 Claims, 7 Drawing Sheets

(56) References Cited

FOREIGN PATENT DOCUMENTS

| CN | 203592961 U | 5/2014 |
| CN | 203937565 U | 11/2014 |
| CN | 205256167 U | 12/2015 |
| CN | 205743368 U | 4/2016 |

* cited by examiner

SYSTEMS AND METHODS FOR OPENING A VEHICLE DOOR

RELATED APPLICATION

This application claims the benefit of Chinese Patent Application No. CN 201710829182.7, filed Sep. 14, 2017, the entire contents thereof being incorporated herein by reference.

FIELD

The present disclosure relates to a system and a method for opening a vehicle door, in particular to a system a method for opening a door of a vehicle from an interior of a vehicle.

BACKGROUND

In some road layouts, a pedestrian lane or a bicycle lane is adjacent to a vehicle lane. When a driver of a vehicle stops and opens a vehicle door at the vehicle lane without looking back first, the vehicle door may hit a pedestrian in the adjacent pedestrian lane or a bike rider who walks or bikes fast.

Some techniques were developed to address this issue. For example, Chinese patent application No. CN203937565U discloses a system for opening a vehicle door. The system includes a sensor mounted on an inner handle of a vehicle door and an alert unit. When a hand of a driver or a passenger touches the inner handle, the sensor sends a signal to the alert unit. The alert unit issues a sound or illuminate a light to alert the user to an approaching vehicle, a bike or a pedestrian.

In another example, Chinese patent application CN205256167U discloses a system for opening a vehicle door. The system includes a sensor mounted at an outer surface of the door and a controller for operate the door. The sensor detects if there is a pedestrian with a predetermined distance to the door. If the sensor determines a pedestrian appears within the predetermined distance to the door, the controller prohibits the door from opening to avoid clash of the door with the pedestrian walking through a door opening passage. In these systems, sensors are required to detect if the user has an intent to open the door or if a pedestrian will walk through the door opening passage. Sometimes a mistake may happen such that the door is locked automatically while no pedestrian is passing through, which wastes time and decreases user satisfaction. Further, these systems rely on sensors or controllers for opening the door safely.

In yet another example, Chinese patent application CN205743368U disclose a mechanism for opening a vehicle door with a right hand of a driver. The mechanism includes an activator for triggering the operation of the door handle. In order to open the door, a thumb of a right hand of the driver is required to push the activator. As a result, the driver or a passenger sitting in the same side of the driver have to turn left to open the door with the right hand, and direct his or her line of sight toward a rear. In this way, a vehicle, a bike or a pedestrian moving forward toward the opened door from the rear of the vehicle can be noticed by the driver.

This mechanism adds one more step to open the door (i.e., press the activator) and is less flexible because of lack of availability of the conventional door opening system. It is desirable to have a system to address the above-mentioned issues and provide satisfactory user experience.

SUMMARY

The present disclosure provides a system and a method for opening a door of a vehicle, in particular, a system and a method that include a mode requiring a user to look rearward when opening a door of a vehicle.

According to one aspect of the present disclosure, a system for opening a door of a vehicle from an interior of the vehicle is provided. The system includes a handle disposed on an inner surface of the door, a proximity sensor, a latch assembly connected with the handle, and a controller in corner communication with the proximity sensor and the latch assembly. The handle has a connection portion pivotally connected with the door and a grabbing portion opposite to the connection portion. The proximity sensor is configured to detect an object in proximity. The latch assembly is configured to be locked to keep the door closed or unlocked to allow the door opened. The controller is configured to, at a first mode, activate the latch assembly when the proximity sensor detects the object in proximity or the object contacting the proximity sensor such that an opening action on the handle is capable of unlocking the latch assembly.

In some embodiments, a distance between the proximity sensor and the grabbing portion of the handle may be configured to allow a thumb of a hand of a user and one of remaining fingers contacting the proximity sensor and the grabbing portion, respectively at the same time. In some embodiments, the proximity sensor may be disposed on the connection portion of the handle. In some embodiments, the proximity sensor may be disposed on the inner surface of the door and adjacent to the connection portion of the handle.

In some embodiments, the proximity sensor may be disposed further away from the grabbing portion than the connection portion of the handle. In some embodiments, the proximity sensor may be a capacitive sensor.

In some embodiments, the system may further include a mode selection switch. The controller may be further configured to operate the door at the first mode or a second mode in response to a signal from the mode selection switch. The opening action on the grabbing portion of the handle alone may be capable of releasing the latch assembly at the second mode.

In some embodiments, the latch assembly may have a driving passage which is connectable or disconnectable. The driving passage may be connected when the proximity sensor detects the object in proximity or detect the object contacting the proximity sensor, and the opening action on the handle is capable of unlocking the latch assembly when the driving passage is connected.

In some embodiments, the controller may be configured to instruct a connection of the driving passage of the latch assembly to allow the opening action on the handle alone to unlock the latch assembly in response a selection of the second mode via the mode selection switch.

In some embodiments, the latch assembly may comprise a first latch and a second latch independent of each other. The controller may be further configured to unlock the first latch in response that the proximity sensor detects the object in proximity or detects that the object is contacting the proximity sensor, such that the opening action on the handle is capable of unlock the second latch to allow the door being opened.

According to another embodiment of the present disclosure, a vehicle is provided. The vehicle includes a door, an inner handle disposed on an inner surface of the door, at least one proximity sensor disposed on the inner surface of the door, a latch assembly coupled with the handle, a mode selection switch to operate the door at a first mode or a second mode, and a controller in communication with the proximity sensor and the latch assembly. The inner handle has a connection portion pivotally connected with the door and a grabbing portion opposite to the connection portion. The proximity sensor is disposed on the inner surface of the door, adjacent to the connection portion and spaced apart from the grabbing portion of the handle. A distance between the proximity sensor and the grabbing portion is configured to allow a thumb of a hand of a user contacting the proximity sensor and one of remaining fingers of the hand operating the grabbing portion at the same time. The latch assembly is coupled with the grabbing portion of the handle and configured to lock the door to keep the door closed and unlock the door to allow the door opened. The controller is configured to, at the first mode, activate the latch assembly to allow unlocking of the latch assembly when the proximity sensor detects an object in proximity, and at the second mode, unlock the latch assembly in response to an opening action on the grabbing portion of the inner handle alone.

In some embodiments, the at least one proximity sensor is arranged in a row in a direction away from the grabbing portion of the inner handle. In some embodiments, the vehicle includes a plurality of proximity sensors, each of the proximity sensors may have different distances from the grabbing portion of the inner handle and is in communication with the controller.

In some embodiments, the vehicle may further include an indicator disposed adjacent to the proximity sensor and may be configured to guide a user to contact or approach the proximity sensor.

In some embodiments, the vehicle may further include an alert unit in communication with the controller and a handle operation detecting sensor coupled to the inner handle. The alert unit is configured to send an alert in response to an opening action on the grabbing portion of the inner handle when the proximity sensor is not activated at the first mode. In some embodiments, the alert unit may comprise one of an alert light source disposed adjacent to the grabbing portion of the inner handle, a text displaying module disposed adjacent to the grabbing portion of the inner handle, a speaker, and a vibration module on a seat of the vehicle or on the inner handle.

In some embodiments, the mode selection switch may be disposed at a steering wheel or an instrument panel of the vehicle.

According to yet another embodiment of the present disclosure, a method for opening a door of a vehicle from an interior of the vehicle is provided. The door includes an inner handle having a connection portion pivotally connected to the door and a grabbing portion opposite to the connection portion, a latch assembly, and a proximity sensor adjacent to the connection portion. The method includes operating the door at a first mode in response to a selection of a user; detecting whether a finger of the user is in proximity to the proximity sensor; and unlocking the latch assembly to allow the door to be opened when the proximity sensor detects the finger is in proximity and an opening action on the grabbing portion of the inner handle is performed.

In some embodiments, the proximity sensor may be positioned such that the user is capable of contacting the proximity sensor and moving the inner handle with a hand spaced further away from the door at the same time.

In some embodiments, the method may further include operating the door at a second mode in response to the selection of the user. At the second mode, the latch assembly may be unlocked in response to an opening action on the grabbing portion of the inner handle to allow the door to be opened.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

DETAILED DESCRIPTION

Embodiments of the present disclosure are described herein. It is to be understood, however, that the disclosed embodiments are merely examples and other alternative embodiments can take various forms. The figures are not necessarily to be drawn in scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

When using Dutch Reach to open a vehicle door from an interior of a vehicle, a user has to use a hand closer to a center of a vehicle to open the door. For example, the user seated at the left of the vehicle should use a right hand to open a left door and the user seated at the right of the vehicle should use a left hand to open the right door. In this way, the user has to turn his or her head and naturally direct his or her line of sight rearwards. Such opening approach enables the user notice whether there is an object (e.g., a vehicle or a pedestrian) coming to the door and refrain to open the door if the object is moving toward the vehicle. The inventors of the present disclosure have realized that the system for opening a vehicle door may be configured to include at least a mode to open the door with the Dutch Reach.

Figure 1:
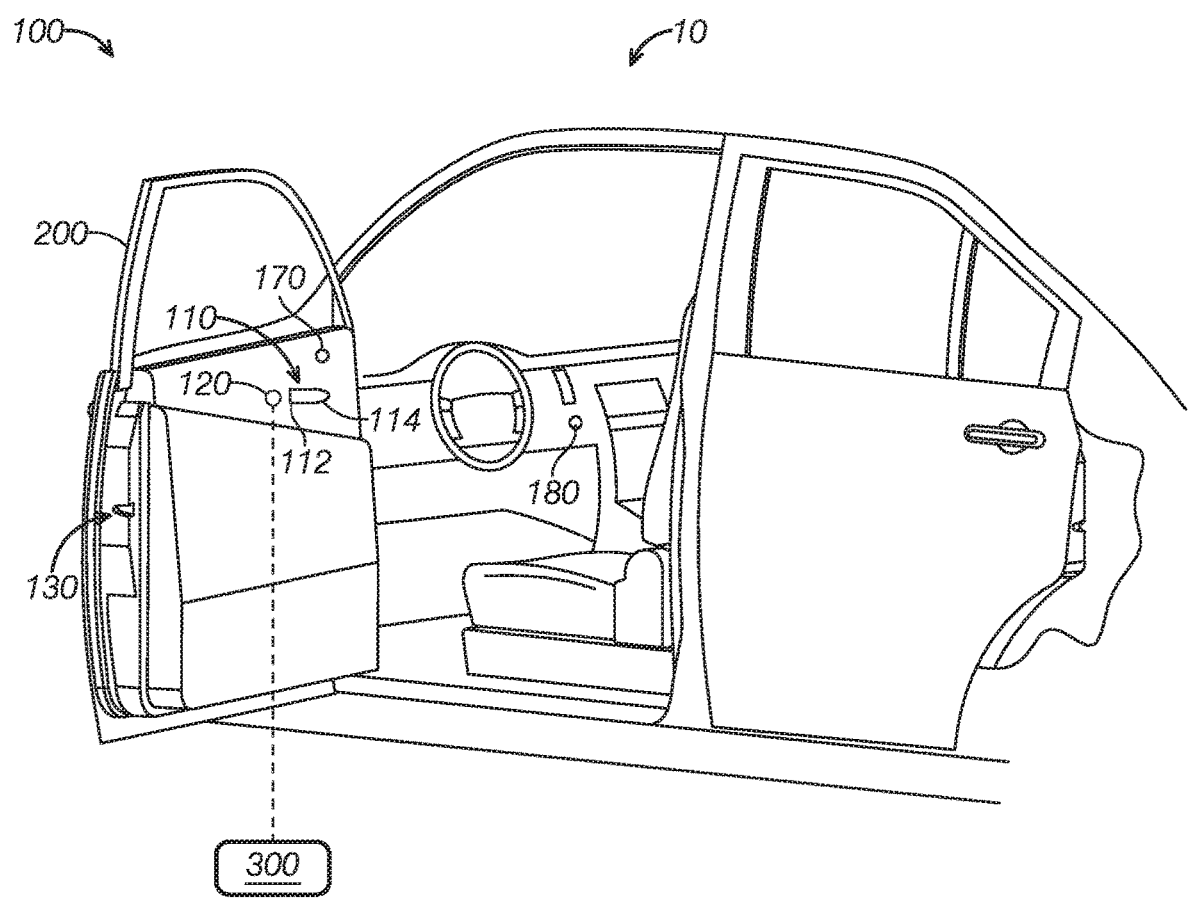
FIG. 1 is a perspective view of a vehicle according to an embodiment of the present disclosure, illustrating a system for opening a door of a vehicle and showing the door at an opened state.

FIG. 1 is a perspective partial view of a vehicle 10. As shown in FIG. 1, the vehicle 10 includes a system for opening a door of the vehicle 100 and the door 200. The door 200 may pivot about a connection mechanism coupled at a first side of the door 200, and be retained at a body (e.g., a B pillar of the vehicle 10) of the vehicle 10 with a lock mechanism disposed at a second side opposite to the first side of the door 200. When the vehicle 10 stops and a user opens the door 200, the door 200 may pivot about the connection mechanism to an opened state as shown in FIG. 1.

In some embodiments, as shown in FIG. 1, the system 100 includes a handle 110 disposed on an inner surface of the door 200, a proximity sensor 120 disposed adjacent to a first end of the handle 110, a latch assembly 130 to be driven by the handle 110 to lock or unlock the door 200, and a controller 300 in communication with the latch assembly 130 and the proximity sensor 120. The controller 300 may be configured to operate the door 200 at a first mode. At the first mode, if the proximity sensor 120 determines that an object such as a finger of a user is in proximity and an opening action is executed on the handle 110 (e.g., pulling the handle 110), the latch assembly 130 may be unlocked to allow the door 200 to be opened. The controller 300 excutes one or more control processes (e.g., a process for controlling the latch assembly 130 of the door 200) to monitor and implement the door opening mode.

The latch assembly 130 may have an unlocked state and a locked state. At the unlocked state, the door 200 may be opened from the body of the vehicle 10 by pushing the door from the interior to exterior of the vehicle 10 or pulling the door from the exterior to interior of the vehicle 10. At the locked state, the door 200 is retained on the body of the vehicle 10 and cannot be opened by the pushing or pulling force. In an embodiment, the latch assembly 130 has a driving passage. If the driving passage is engaged, the latch assembly 130 can be driven to the unlocked state, e.g., by operating the handle 110. At the first mode, if the proximity sensor 120 detects that a finger is contacting or in proximity to the proximity sensor 120, the driving passage of the latch assembly 130 may be engaged. At the first mode, the door 200 can be opened only when the object contacts or approaches the proximity sensor 120 and the handle 110 is operated by the user.

In the embodiment as shown in FIG. 1, if a user of the vehicle 10 intends to open the door 200 with a left hand at the first mode, it will be inconvenient for him or her to make these two actions with the left hand, which motivates the user to use a right hand. During the process of opening the door 200, the user has to turn his body towards the door 200 by an angle. In this way, the user can see the road conditions outside of the vehicle 10 at the left and rear of the door 200. If an object such as a pedestrian, a bicycle, or vehicle is coming close to the door opening passage of the door 200, the user can choose not to open the door 200 and avoid clash of the opened door with the fast approaching object.

In some embodiments, the system 100 may be operated with only the first mode, that is, with Dutch Reach. In some embodiments, the system 100 can be configured to operate with more than one mode according to the selection of the user. For example, the user can select to open the door 200 with Dutch Reach or with a conventional method. At the first mode, the user has to turn his or her body to open the door 200 with a hand spaced further from the door 200. Frequent use of the first mode can make the Dutch Reach become a habit of the user when opening a vehicle door. The availability of a second mode of conventional approach provides flexibility for the user selection.

It will be appreciated that, the handle 110 may be referred to as an inner handle for opening the door 200 from an interior of the vehicle 10. The inner surface of the door 200 may be a surface of the door 200 adjacent to a passenger compartment of the vehicle 10, or an outer surface of a trim disposed on the door 200. A user in the vehicle 10 may operate the handle 110 to unlock the latch assembly 130, and push the door 200 to pivot the door 200 to an opened state as shown in FIG. 1. As shown in FIG. 1 the door 200 is the driver side door, and the user may be a driver of the vehicle 10. However, the door 200 and the user are not limited as described in FIG. 1, e.g., the door could be a front passenger side door or rear passenger side doors while the user could be a front passenger or rear passengers.

The handle 110 includes two opposite end portions, e.g., a connection portion 112 pivotable about the door 200 and a grabbing portion 114. The grabbing portion 114 may be operated by one or more fingers of the user, and pivot about the door 200 towards the interior of the vehicle 10 with the connection portion 112 (corresponding to an opening action of the handle 110 or grabbing portion 114) to unlock the latch assembly 130 to allow the door 200 to be opened.

In some embodiments, the proximity sensor 120 is disposed to be spaced apart from the grabbing portion 114 of the handle 110 and configured to detect if an object such as a finger of a user is approaching or contacting the proximity sensor 120. A distance between the proximity sensor 120 and the grabbing portion 114 of the handle 110 may be defined such that a thumb and remaining fingers of one hand of the user can contact the proximity sensor 120 and the grabbing portion 114 at the same time. In this way, it is not convenient for the user to open the door 200 with a hand adjacent to the door 200, while it is convenient for the user to open the door 200 with a hand distal from the door 200 (i.e., with a gesture similar to Dutch Reach).

Figure 4:
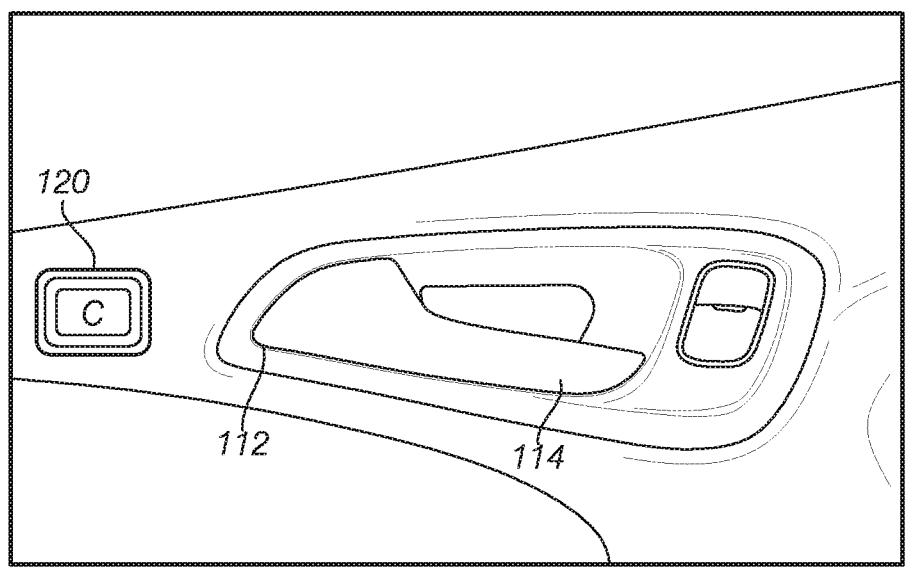
FIG. 4 is a side view of a partial door of a vehicle according to another embodiment of the present disclosure, illustrating a position of a sensor of a system for opening the door.

Referring to FIGS. 1 and 4, in some embodiments, the proximity sensor 120 is disposed on the inner surface of the door 200 and adjacent to the connection portion 112. Considering that the size of the handle 110 is smaller compared to a hand in some situations, the proximity sensor 120 may be disposed at a position further away from the grabbing portion 114 relative to the connection portion 112 of the handle 110, as shown in FIGS. 1 and 4.

Figure 3:
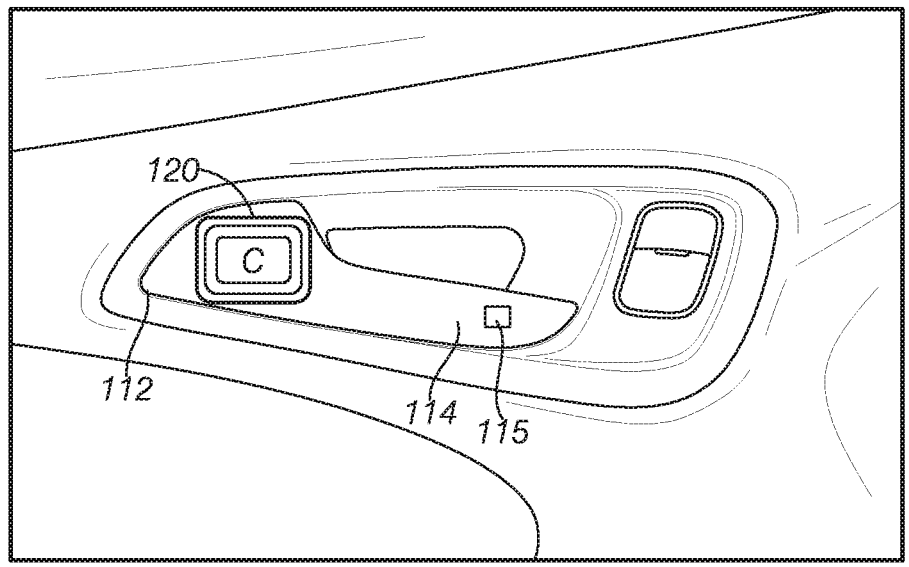
FIG. 3 is a side view of a partial door of a vehicle according to an embodiment of the present disclosure, illustrating a position of a sensor of a system for opening the door.

Referring to FIG. 3, in some embodiments, the proximity sensor 120 may be disposed on the connection portion 112 of the handle 110, which is more convenient for users having relative smaller hands like women or children.

Figure 2:
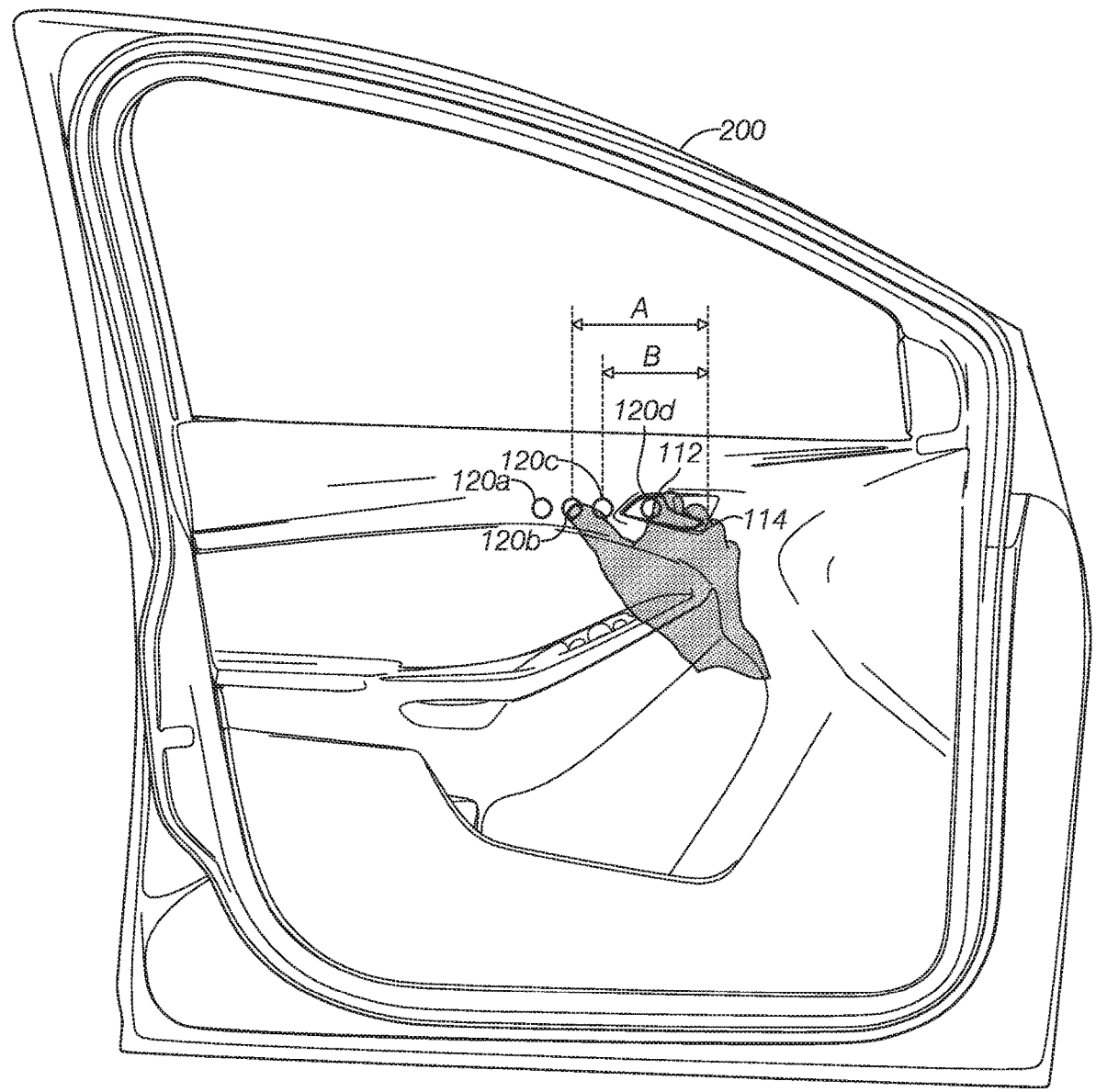
FIG. 2 is a perspective view of a system for opening a door of a vehicle, illustrating a hand gesture for opening the door.

Referring to FIG. 2, in some embodiments, the system 100 may include a plurality of proximity sensors 120a, 120b, 120c, and 120d having different distances from the grabbing portion 114 of the handle 110. Each proximity sensor may operate the latch assembly 130 in response to an output of the controller 300 independently. That is, each proximity sensor may detect an approaching object and actuate the latch assembly 130 or engage the driving passage of the latch assembly 130 independently. As shown in FIG. 2, the proximity sensors 120a, 120b, 120c, and 120d are arranged in a line in a direction away from the grabbing portion 114, i.e., in a direction extending laterally to left from the connection portion 112.

In some embodiments, for a user with a larger hand such as an adult men, be may choose the proximity sensor 120b for activating the latch assembly 130, as the proximity sensor 120b has a larger distance A with the grabbing portion 114, which facilitates this user to have his thumb approaching or contacting the proximity sensor 120b while remaining fingers operate the grabbing portion 114 at the same time to execute an operation at the first mode.

Similarly, for a user with a smaller hand such as a woman or a child, she may choose the proximity sensor 120c for actuating the latch assembly 130, as the proximity sensor 120c has a smaller distance B with the grabbing portion 114, which facilitates this user to operate at the first mode.

It will be appreciated that the present disclosure is not limited to the four proximity sensors arranged in a line in a direction away from the grabbing portion 114. Those with ordinary skills in the art may properly design the number, position, or direction of the proximity sensors according to practical requirements, which may be construed as included in the scope of the present disclosure.

In some embodiments, the proximity sensor 120 may be capacitive sensors. The proximity sensor 120 includes a sense activation field to sense contact or close proximity (e.g., within one millimeter) of an object, such as the hand (palm or fingers) of a user. The capacitive sensor may operate as a capacitive switch. The sensing activation field of the proximity sensor 120 is a capacitive field and the user's hand has electrical conductivity and dielectric properties that cause a change or disturbance in the sensing activation field. It should also be appreciated by those skilled in the art that additional or alternative types of proximity sensors can be used, including but not limited to, inductive sensors, optical sensors, temperatures sensors, resistive sensors, the like, or a combination thereof. Exemplary proximity sensors are described in the Apr. 9, 2009, ATMEL® Touch Sensors Design Guide, 10620 D-AT42-04/09, the entire reference hereby being incorporated herein by reference.

In some embodiments, the proximity sensor 120 may be formed by printing conductive ink onto the connection portion 112 of the handle 110 or onto the inner surface of the door 200. In some embodiments, the proximity sensor 120 may be formed by mounting pre-assembled conductive circuit board on connection portion 112 of the handle 110 or onto the inner surface of the door 200.

In some embodiments, as shown in FIGS. 3-4, the system 100 includes an indicator C around the proximity sensor 120 for indicating the position of the proximity sensor 120. With the indicator C, it is convenient for the user to find the proximity sensor 120 and to contact or approach the proximity sensor 120 with his hand or finger.

In some embodiments, the indicator C may be formed as a pattern or a text. The indicator C may include a light display. If the user selects to operate at the first mode, the sign indicator may be lighted to alert the driver or passengers to open the door 200 with a gesture corresponding to the first mode, i.e., Dutch Reach.

Referring to FIG. 1, in some embodiments, the system 100 further includes an alert unit 170 in communication with the controller 300. At the first mode, if the proximity sensor 120 is not actuated or triggered (e.g., the proximity sensor 120 does not detect a hand or a finger and the grabbing portion 114 of the handle 110 is operated (e.g., an opening action is applied on the grabbing grabbing portion 114), the alert unit 170 sends an alert to the user to remind the user to open the door 200 with Dutch Reach. In such embodiments, the handle 110 includes a handle operation detecting sensor in communication with the controller 300, such as a capacitive sensor or a pressure sensor, for detecting whether the grabbing portion 114 is operated. The information from the handle operation sensor may be be sent to the controller 300. The alert unit 170 is not limited to an alerting light disposed adjacent to the grabbing portion 114 as shown in FIG. 1, other embodiments include a display module adjacent to the grabbing portion 114 (such as text display on the window of the door 200), a speaker at any positions in the vehicle 10, a vibration module mounted on the handle 110 or a seat of the vehicle 10, or any combinations thereof.

Figure 5:
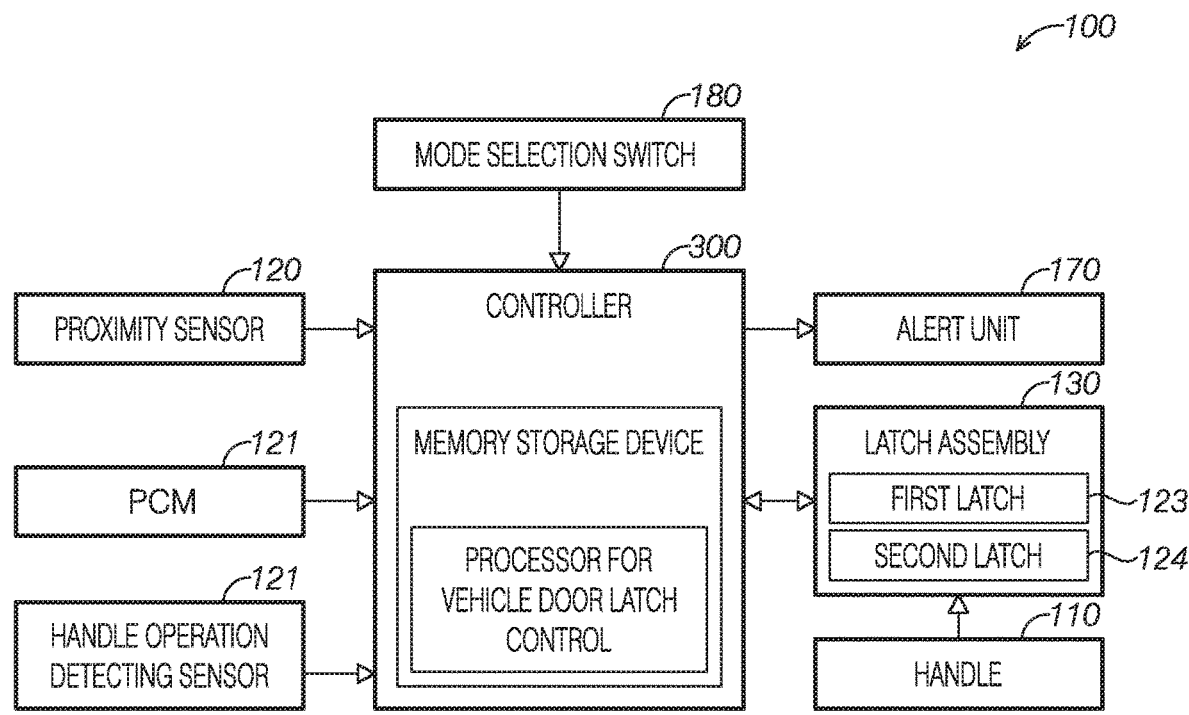
FIG. 5 is a flow chart illustrating a method for opening a door according to an embodiment of the present disclosure.

FIG. 5 is a block diagram illustrating a system 100 for opening a door of a vehicle. As described above, the system 100 includes the handle 110, the proximity sensor 120, the latch assembly 130 to be locked and unlocked via the handle 110, and the controller 300. The controller 300 may include a microprocessor unit or a central processing unit (CPU) in communication with memory storage device. The memory storage device may include various types of computer readable memory storage device or media and include volatile or non-volatile memories such as read only memory (ROM), random access memory (RAM), keep alive memory (KAM). A routine or program implementing the method of opening the vehicle door may be stored in the memory storage device.

The controller 300 may perform one or more processes stored in the memories, such as a routine for controlling the latch assembly 130. The controller 300 may be a single controller, or integrated in an on-board computer system or powertrain control module (PCM) 121 of the vehicle 10.

The controller 300 is configured to control unlock or lock of the door 200 in response to a signal from the proximity sensor 120. In some embodiments, the system 100 further includes a handle operation detecting sensor 122. At the first mode, in response detection of an object at a certain distance to the proximity sensor 120 by the proximity sensor 120 and detection of the operation of the handle 110 by the handle operation detecting sensor, the controller 300 may unlock the latch assembly 130 to allow the door 200 to be opened. The operation of the handle may be an action of pulling the handle 110.

In some embodiments, the system 100 is in communication with the PCM 121. For example, the system 100 may receive messages indicating whether the powertrain is on/off from the PCM 121.

In some embodiments, the system 100 further includes a mode selection switch 180. The user may operate the mode selection switch 180 to select the first or second mode. In some embodiments, as shown in FIG. 1, the mode selection switch 180 may be disposed at a steering wheel or an instrument panel of the vehicle 10, which is convenient for a user to operate. The controller 300 may control opening of the door 200 at different modes in response to outputs from the mode selection switch 180.

At the first mode, if the proximity sensor 120 detects a finger is approaching or contacting, the controller 300 may activate the latch assembly 130, e.g., connecting driving passage of the latch assembly 130. At the same time when the finger is approaching or contacting the proximity sensor 120, an opening action on the handle 110 can unlock the door 200. That is, at the first mode, it is convenient for the user to open the door 200 with a hand further away from the door 200 (e.g., a right hand to open the left vehicle door). The first mode may also be referred as a Dutch Reach mode or a user guide mode. At the first mode, the possibility that the suddenly opened door is hit by an object (a bicycle or a pedestrian) coming from the rear of the vehicle 10 can be reduced, and the user may be cultivated a habit of seeing around outside the door 200 and behind the vehicle 20 when or she is forced to open the door with the hand further away from the door at the first mode.

At the second mode, the latch assembly 130 can be unlocked to allow the door 200 to be opened through only the opening action on the grabbing portion 114 of the handle 110. The second mode is also called a normal opening mode.

In some embodiments, the opening action may be performed manually by the user. In some embodiments, the opening action on the handle 110 may be performed automatically with a sensor (such as a capacitive sensor or a pressure sensor) in either the first mode or the second mode. For example, the handle operation detecting sensor 122 may be configured to be in communication with the controller 300, and the controller 300 unlocks the latch assembly 130 when the opening action on the grabbing portion 114 is detected by the handle operation detecting sensor 122 and a signal is sent to the controller 300.

The system 100 has the advantages to help a user to develop a habit to open a vehicle door safely. For example, after a user sets up the door opening operation at the first mode for an extended period, the user can develop a habit of looking rearward to examine if it is safe to open the door before pulling the handle 110. With the habit of looking rearward when operating the handle 110, the user may select to use the second mode. With the custom to look rearward before opening the door, the user can open the door easily and safely at the second mode at some conditions (e.g., stops with no adjacent lane or adjacent area for a vehicle, a bike or a pedestrian).

Referring to FIG. 5, in some embodiments, the first and second modes can be implemented with a plurality of latches. As shown in FIG. 5, the latch assembly 130 may include a first latch 123 and a second latch 124 independent of each other. At the first mode, the door is locked by the first and second latches. The first latch 123 may be in communication with the proximity sensor 120 and the controller 300. The controller 300 unlocks the first latch 123 if the proximity sensor 120 detects a finger is approaching or contacting. The second latch 124 may be a conventional latch capable of being locked or unlocked with an opening action on the handle 110. After the first latch 123 is unlocked, the opening action on the grabbing portion 114 of the handle 110 can release the second latch 124. When both the first and second latches 123, 124 are unlocked, the door 200 can be opened.

In some embodiments, if the second mode is selected via the mode selection switch, the controller 300 unlocks the first latch 123, by controlling a motor coupled with the first latch 123. That is, at the second mode, the first latch 123 is pre-unlocked and the door 200 is locked or unlocked by only the second latch 124, and an opening action on the handle 110 can unlock the second latch 124 to open the door. In this way, both the first and second latches 123, 124 are unlocked and the door 200 can be opened. In other words, both the first and second latches 123, 124 function at the first mode, while only the second latch 124 functions at the second mode.

Figure 6:
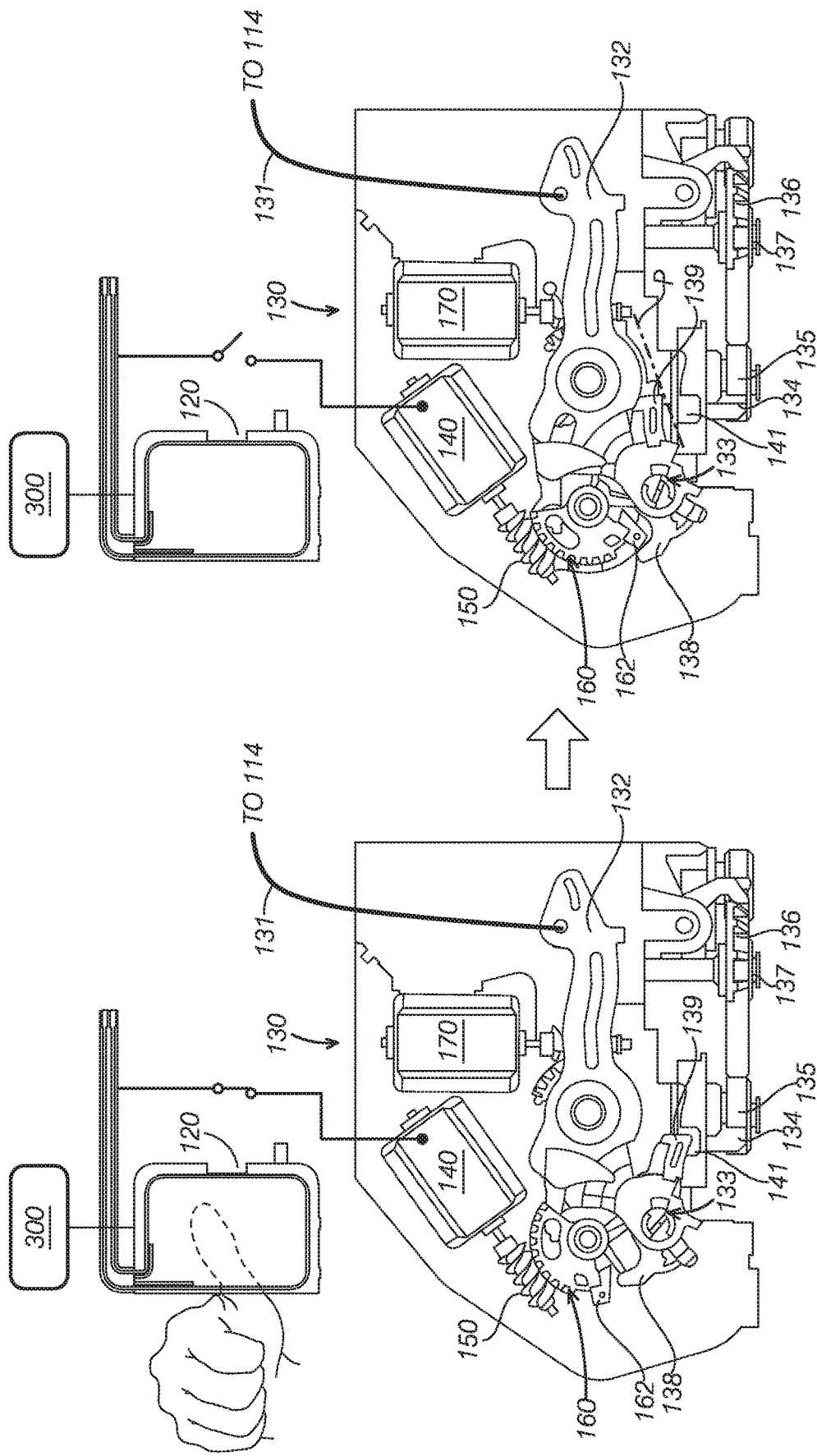
FIG. 6A and FIG. 6B are partial views of a system for opening a door of a vehicle according to an embodiment of the present disclosure, illustrating driving passages of latch assemblies of the systems in a disengaged state and an engaged state, respectively.

In some embodiments, as shown in FIGS. 6A and 6B, the first and second modes can be implemented with one latch assembly 130. At the first mode, a driving passage P of the latch assembly 130 is disengaged as shown in FIG. 6B, and the latch assembly 130 may not be unlocked with only an opening action on the grabbing portion 114 of the handle 110. If the proximity sensor 120 detects a finger or a hand is approaching or contacting (or staying in this position), the driving passage P may be engaged or connected as shown in FIG. 6A, allowing the subsequent opening action on the handle 110 to unlock the latch assembly 130.

In some embodiments, if the user selects the second mode via the mode selection switch, the controller 300 may instruct a motor to connect the driving passage P (e.g., by sending a signal to the motor in communication with the controller 300), allowing a subsequent opening action on the handle 100 to unlock the latch assembly 130.

Figure 7:
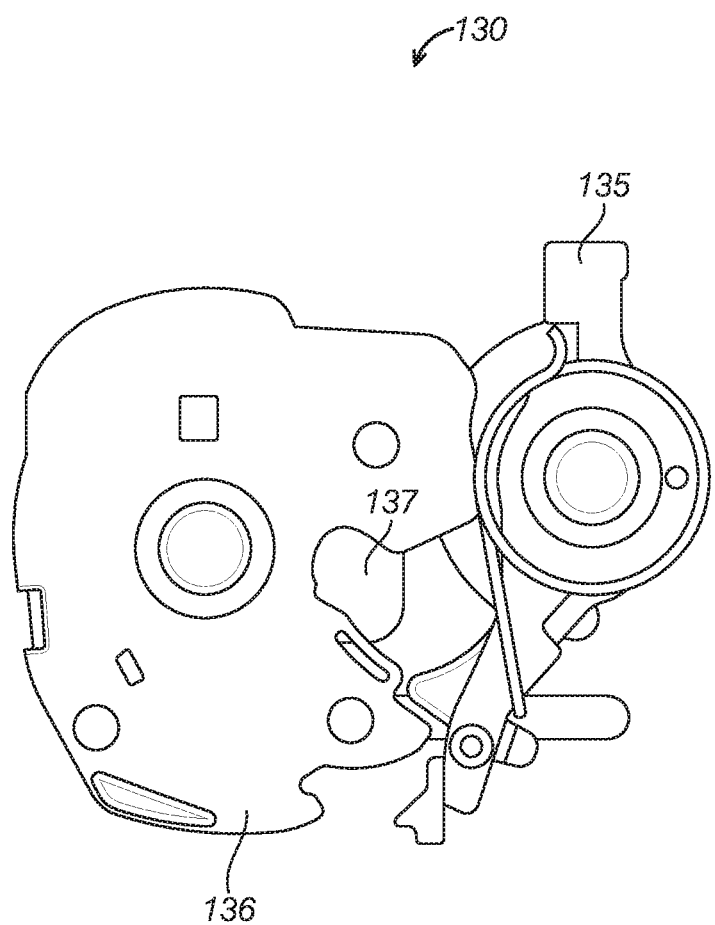
FIG. 7 is a partial view of a latch assembly of a system for opening a door of a vehicle according to an embodiment of the present disclosure, illustrating a state of the latch assembly corresponding to the door at a locked state.

In some embodiments, as shown in FIGS. 6A, 6B and 7, the latch assembly 130 may include a cable 131 connected with the grabbing portion 114 of the handle 110, an inside handle 132 moveable with the cable 131, a lock rod 133 pivotally coupled to the inside handle 132 and capable of translating or rotating with the inside handle 132, a release rod 134 selectively engaged with the lock rod 133, a securing plate 135 having an end contacting with and being able to be pushed by the release rod 134, a catch 136 selectively contacting the securing plate 135, and a hook 137 selectively engaged with the catch 136.

The hook 137 is positioned on the body (such as B pillar). The engagement and disengagement of the hook 137 with the catch 136 defines a locked state and an unlocked state of the latch assembly 130, respectively. The system 100 further includes a first motor 140, a worm 150 driven by the first motor 140, and a turbine 160 engaged with the worm 150. The turbine 160 has a protrusion 162 contacting a first end 138 of the lock rod 133. A second end 139 of the lock rod 133 is selectively engaged with a recess 141 in the release rod 134. The second end 139 of the lock rod 133 is illustrated to be engaged in the recess 141 of the release rod 134 in FIG. 6A, i.e., the driving passage P of the latch assembly 130 is connected.

In the locked state as shown in FIG. 6B, the catch 136 is engaged with the hook 137 to lock the door 200 (as shown in FIG. 7). The protrusion 162 of the turbine 160 rests against the first end 138 of the lock rod 133, such that the second end 139 of the lock rod 138 sway upwards to move away from the recess 141, i.e., disengaging or releasing from the release rod 134 as shown in FIG. 6B. At this condition, the driving passage P of the latch assembly 130 is disconnected at an intersection between the lock rod 138 and the release rod 134, as shown with a dashed line D in FIG. 6B. Pulling the cable 131 (i.e., corresponding to the opening action on the handle 110) may not drive the securing plate 135 to release the catch 136 and the hook 137. That is, the latch assembly 130 are stilled at the locked state.

At the first mode, as shown in FIG. 6A, if the proximity sensor 120 detects a finger or a hand is approaching or contacting, the first motor 140 drives the worm 150 to push the turbine 160 in response to signals from the controller 300. As the protrusion 162 of the turbine 160 rotates clockwise, the first end 138 of the lock rod 133 sways upwards and the second end 139 of the lock rod 133 sway downwards to engage with the recess 141 of the release rod 134. In this way, the driving passage P of the latch assembly 130 is connected.

If the cable 131 is pulled at this time, the inside handle 132 may sway and push the lock rod 133 to further push the release rod 134 forwards, and the securing plate 135 is pushed by the release rod 134 such that the catch 136 is released from the hook 137 (not shown). In this way, the latch assembly 130 is unlocked, allowing the door 200 to be opened. As described, the first motor 140 may be used for connecting the driving passage P and assisting the opening of the door at the first mode.

In some embodiments, as shown in FIGS. 6A and 6B, the system 100 may further include a second motor 170 in communication with the controller 300 for driving the lock rod 133 to engage and disengage the lock rod 133 with the release rod 134 directly. That is, in addition to use the proximity sensor 120 and the first motor 140 for connecting the driving passage P, the second motor 170 may be used to connect the driving passage P. In some embodiments, if the user selects the second mode via the mode selection switch, the second motor 170 drives the lock rod 133 in response to signals from the controller 300 such that the second end 139 of the lock rod 133 sways downwards to engage with the release rod 134 and thereby the driving passage P of the latch assembly 130 is connected. With the driving passage P connected, a pulling force on the cable 131 may push the catch 136 to release from the hook 137, allowing the door 200 to be opened.

Figure 8:
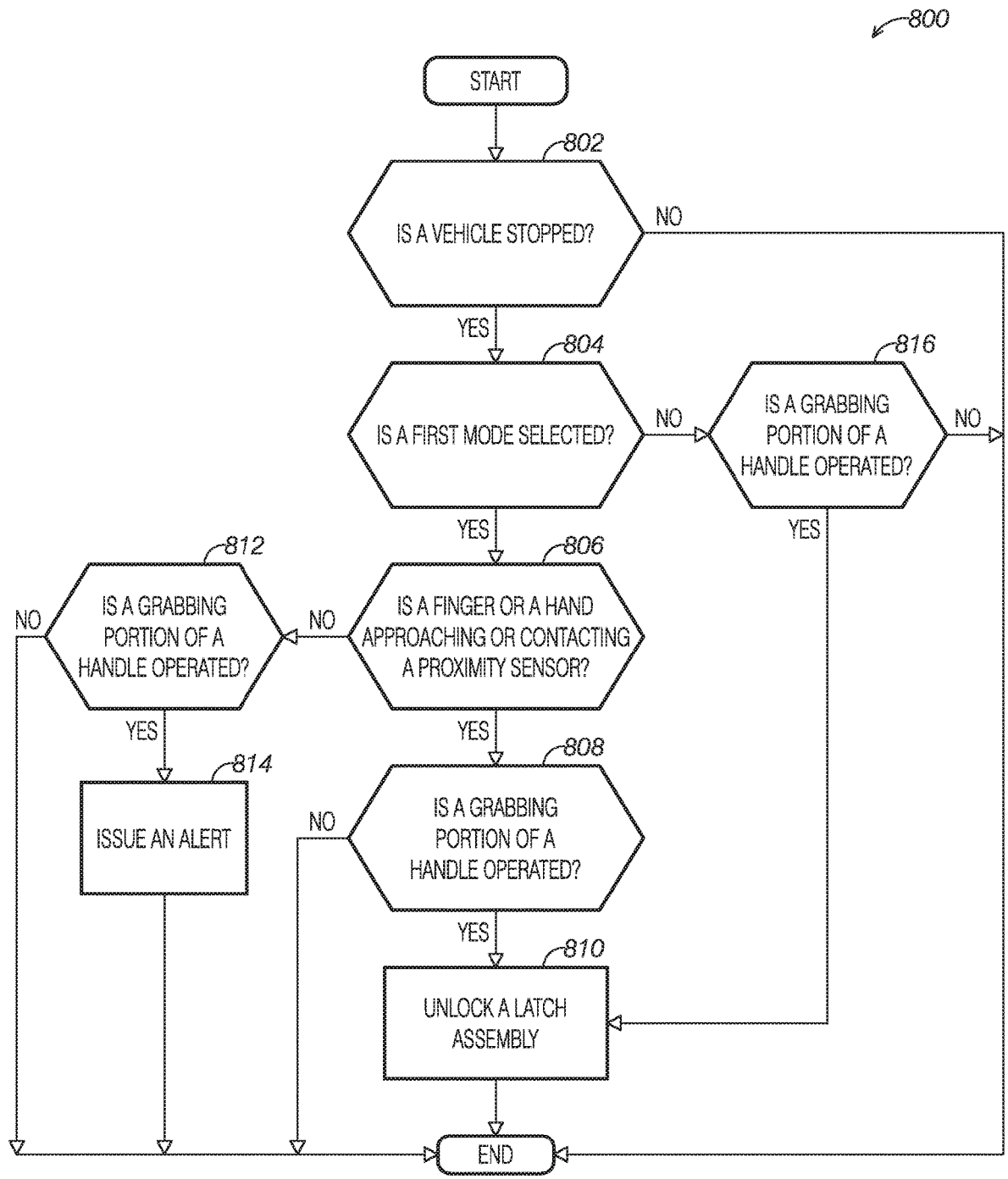
FIG. 8 is a flow chart illustrating a method for opening a door of a vehicle according to an embodiment of the present disclosure.

FIG. 8 is a flow chart showing a method for opening a door of a vehicle from an interior of the vehicle 800. The vehicle has the door 200 and the system 100 as described in associated with FIGS. 1-7. At 802, the method 800 determines whether the vehicle is stopped based on various parameters of the vehicle. For example, the method 800 may determine the vehicle is stopped based on a power-off message from the PCM. If it is determined that the vehicle is not stopped, the method 800 ends. If it is determined the vehicle is stopped, the method proceeds. At 804, the method 800 may include determining whether a first mode is selected by a user based on operations of a mode selection switch. If it is determined the first mode is selected, the method 800 may include determining whether an object such as a finger or a hand is in proximity (e.g., approaching or contacting) to a proximity sensor 120. If it is determined the object is in the proximity of the proximity sensor 120, the method 800 may include determining whether grabbing portion 114 of the handle 110 is operated (e.g., whether there is a pulling force on the grabbing portion 114) at 808. If it is determined that the grabbing portion 114 of the handle 110 is operated or pulled, the method may include unlocking the latch assembly 130 to allow the door 200 to be opened at 810.

If it is determined that there is no object in the proximity to the proximity sensor 120, the method 800 may include determining whether the grabbing portion 114 of the handle 110 is operated or pulled at 812. If answer is yes, at 814, an alert is is issued to remind the user to use the Dutch Reach gesture to open the door.

At 804, if it is determined that the first mode is not selected, the method 800 may execute the operation of the second mode. At 816, the method 800 may determine whether the grabbing portion 114 of the handle 110 is operated or pulled. If answer is yes, the method 800 may proceed to step 810 to unlock the latch assembly 130, and allow the door to be opened. In this way, a conventional opening gesture can be used to open the door.

The systems and methods for opening a door of a vehicle of the present disclosure forces a user to open the door at first mode or a second mode. At the first mode requiring a Dutch Reach gesture to open the door, the user is trained or forced to use the Dutch Reach to open the door. At the second mode, the user can open the door using the conventional approach. In this way, the user is guided to open the door using Dutch Reach to open the door safely while the user is also provided an option to open the door using a conventional method if he or she prefers to at some conditions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible.

It should be appreciated that the embodiments described above are specific examples that do not encompass all possible forms of the disclosure. The features of the illustrated embodiments may be combined to form additional or alternative embodiments of the disclosed concepts. The words used in the specification are words of description rather than limitation, and it is understood that changes can be made without departing from the spirit and scope of the disclosure.

The invention claimed is:

1. A system for opening a door of a vehicle from an interior of the vehicle, comprising:
   a handle disposed on an inner surface of the door, wherein the handle has a connection portion pivotally connected with the door and a grabbing portion opposite to the connection portion;
   a proximity sensor spaced apart from the grabbing portion of the handle and configured to detect an object in proximity;
   a latch assembly connected with the handle and configured to be locked to keep the door closed or unlocked to allow the door opened; and
   a controller configured to, at a first mode, activate the latch assembly when the proximity sensor detects the object in proximity or the object contacting the proximity sensor such that an opening action on the handle is capable of unlocking the latch assembly;
   wherein a distance between the proximity sensor and the grabbing portion of the handle is configured to allow a thumb of a hand of a user and one of remaining fingers contacting the proximity sensor and the grabbing portion, respectively, at the same time.

2. The system of claim 1, wherein the proximity sensor is disposed on the connection portion of the handle.

3. The system of claim 1, wherein the proximity sensor is disposed on the inner surface of the door and adjacent to the connection portion of the handle.

4. The system of claim 3, wherein the proximity sensor is disposed further away from the grabbing portion than the connection portion of the handle.

5. The system of claim 1, wherein the proximity sensor is a capacitive sensor.

6. The system of claim 1, further comprising a mode selection switch, and the controller is further configured to operate the door at the first mode or a second mode in response to a signal from the mode selection switch, wherein the opening action on the grabbing portion of the handle alone is capable of releasing the latch assembly at the second mode.

7. The system of claim 1, wherein the latch assembly has a driving passage which is connectable or dis-connectable, wherein the driving passage is connected when the proximity sensor detects the object in proximity or detects the object contacting the proximity sensor, and the opening action on the handle is capable of unlocking the latch assembly when the driving passage is connected.

8. The system of claim 6, wherein the controller is configured to instruct a connection of a driving passage of the latch assembly to allow the opening action on the handle alone to unlock the latch assembly in response to a selection of the second mode via the mode selection switch.

9. The system of claim 1, wherein the latch assembly comprises a first latch and a second latch independent of each other, the controller is further configured to unlock the first latch in response that the proximity sensor detects the object in proximity or detects that the object is contacting the proximity sensor, such that the opening action on the handle is capable of unlock the second latch to allow the door being opened.

10. A vehicle, comprising:
a door;
an inner handle disposed on an inner surface of the door, wherein the inner handle has a connection portion pivotally connected with the door and a grabbing portion opposite to the connection portion;
at least one proximity sensor disposed on the inner surface of the door, adjacent to the connection portion and spaced apart from the grabbing portion of the inner handle, wherein a distance between the proximity sensor and the grabbing portion is configured to allow a thumb of a hand of a user contacting the proximity sensor and one of remaining fingers of the hand operating the grabbing portion at the same time;
a latch assembly coupled with the grabbing portion of the inner handle and configured to lock the door to keep the door closed and unlock the door to allow the door opened;
a mode selection switch to operate the door at a first mode or a second mode; and a controller configured to, at the first mode, activate the latch assembly to allow unlocking of the latch assembly when the proximity sensor detects an object in proximity, and at the second mode, unlock the latch assembly in response to an opening action on the grabbing portion of the inner handle alone.

11. The vehicle of claim 10, wherein the at least one proximity sensor is arranged in a row in a direction away from the grabbing portion of the inner handle.

12. The vehicle of claim 10, comprising a plurality of proximity sensors wherein each of the proximity sensors has different distances from the grabbing portion of the inner handle and is in communication with the controller.

13. The vehicle of claim 10, further comprising an indicator disposed adjacent to the proximity sensor and configured to guide the user to contact or approach the proximity sensor.

14. The vehicle of claim 10, further comprising an alert unit in communication with the controller and a handle operation detecting sensor coupled to the inner handle, wherein the alert unit is configured to send an alert in response to an opening action on the grabbing portion of the inner handle when the proximity sensor is not activated at the first mode.

15. The vehicle of claim 14, wherein the alert unit comprises one of an alert light source disposed adjacent to the grabbing portion of the inner handle, a text displaying module disposed adjacent to the grabbing portion of the inner handle, a speaker, and a vibration module on a seat of the vehicle or on the inner handle.

16. The vehicle of claim 10, wherein the mode selection switch is disposed at a steering wheel or an instrument panel of the vehicle.

17. A method for opening a door of a vehicle from an interior of the vehicle, the door including an inner handle having a connection portion pivotally connected to the door and a grabbing portion opposite to the connection portion, a latch assembly, and a proximity sensor adjacent to the connection portion, the method comprising:
operating the door at a first mode in response to a selection of a user via a mode selection switch;
detecting if a finger of the user is in proximity to the proximity sensor; and
unlocking the latch assembly to allow the door to be opened when the proximity sensor detects the finger is in proximity and an opening action on the grabbing portion of the inner handle is performed; and
operating the door at the first mode or a second mode in response to a signal from the mode selection switch;
wherein the opening action on the grabbing portion of the inner handle alone is capable of releasing the latch assembly at the second mode.

18. The method of claim 17, wherein the proximity sensor is positioned such that the user is capable of contacting the proximity sensor and moving the inner handle with a hand spaced further away from the door at the same time.

* * * * *